United States Patent Office 2,929,819
Patented Mar. 22, 1960

2,929,819

NEW OXAZOLES

Hans Erlenmeyer, Basel, Switzerland, assignor to Ciba Pharmaceutical Products Inc., Summit, N.J.

No Drawing. Application June 19, 1958
Serial No. 743,018

Claims priority, application Switzerland July 11, 1957

7 Claims. (Cl. 260—296)

This invention relates to new oxazoles, more particularly it concerns 2-pyridyl-oxazoles, and their salts. The new oxazoles may contain substituents in both heterocyclic rings, and especially lower alkyl groups, in particular methyl groups. The oxazole radical can be linked to the 2-, 3- or 4-position of the pyridine nucleus.

The new compounds possess valuable pharmacological properties. Thus, they have an analgesic action. They are useful as medicaments, and especially as analgesics. Especially valuable is 2-pyridyl-(2')-oxazole of the formula

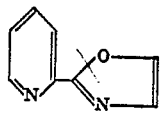

and its salts.

The 2-pyridyl-oxazoles can be made by a method in which an α-(N-[pyridyl-methylidene]-amino)-aldehyde-acetal or -ketone-acetal is subjected to intramolecular condensation under oxidizing conditions.

As a condensing agent having an oxidizing action there is advantageously used phosphorus pentoxide in concentrated sulfuric acid.

This reaction may be carried out in known manner, advantageously at a raised temperature, in the presence or absence of a diluent and/or a condensing agent, in an open or closed vessel.

Depending on the procedure used the new compounds are obtained in the form of the free bases or salts thereof. From the salts the free bases may be formed in the usual manner, for example, by treatment with an alkali. From the free bases therapeutically useful acid addition salts can be made, for example, by reaction with the corresponding acids, for example, hydrohalic acids, sulfuric acid, phosphoric acids, nitric acid, perchloric acid, or aliphatic, aromatic, or heterocyclic carboxylic or sulfonic acids, such as formic acid, acetic acid, propionic acid, oxalic acid, succinic acid, glycollic acid, lactic acid, malic acid, tartaric acid, citric acid, ascorbic acid, oxymaleic acid, dihydroxymaleic acid, pyroracemic acid; or phenylacetic acid, benzoic acid, para-aminobenzoic acid, anthranilic acid, para-hydroxybenzoic acid, salicylic acid or para-aminosalicylic acid; or methane sulfonic acid, ethane sulfonic acid, hydroxyethane sulfonic acid, ethylene sulfonic acid, toluene sulfonic acid or naphthalene sulfonic acid.

The starting materials are known or can be obtained by methods in themselves known. There are advantageously used those which lead to the formation of the especially valuable 2-pyridyl-oxazole mentioned above.

The new oxazoles, and their salts, are useful as medicaments, for example, in the form of pharmaceutical preparations which contain the active compound in admixture with a pharmaceutical organic or inorganic, solid or liquid carrier suitable for enteral, parenteral or topical administration. For making the carrier there are used substances which do not react with the new compounds, for example, water, gelatine, lactose, starches, magnesium stearate, talc, vegetable oils, benzyl alcohols, gums, polyalkylene glycols or other known carrier for medicaments. The pharmaceutical preparations may be in the form of tablets, dragees or in liquid form as solutions, suspension or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances. The preparations are made up by the usual methods.

The following examples illustrate the invention:

Example 1

10 grams of N-[pyridyl-(2)-methylidene]-amino-acetaldehyde-diethylacetal is slowly introduced dropwise, while stirring, at 0° C. into 42 cc. of concentrated sulfuric acid. The mixture becomes dark yellow in color. While cooling well there are then slowly introduced 17 grams of phosphorus pentoxide. The resulting mixture is heated at 120° C. for 20 minutes. The whole is then allowed to cool and the dark reaction mixture is poured on to about 500 grams of ice. After being neutralized with concentrated aqueous ammonia solution, while cooling, the mixture is treated hot several times with active charcoal and the brownish filtrate is subjected to steam distillation. The distillate is obtained (about 3 liters) is concentrated in vacuo to about 500 cc., then saturated with potassium carbonate, and extracted with ether overnight in a Kutscher-Steudel apparatus. The dried ethereal solution is evaporated and the brownish residual oil is distilled under a high vacuum. There passes over at 70–75° C. under 0.1 mm. pressure a colorless oil which consists of pure 2-pyridyl-(2')-oxazole of the formula

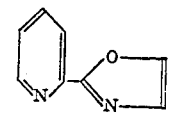

This compound forms a monopicrate, which melts at 165–167° C. after crystallization several times from ethanol.

The diethyl acetal used as starting material may be prepared as follows:

29.5 grams of freshly distilled bromacetaldehyde-diethylacetal (boiling at 80–81° C. under 12 mm. pressure) are mixed with about 150 cc. of liquid ammonia, and the whole is heated for 6 hours at 110° C. under 80 atmospheres pressure in a shaking autoclave. After cooling the mixture, opening the autoclave and evaporating the ammonia, the residue is taken up with a saturated solution of potassium carbonate, and the solution is extracted overnight in a Kutscher-Steudel apparatus. The ethereal solution is dried with sodium sulfate and fractionated over a small Vigreux column. There is obtained amino-acetaldehyde-diethylacetal boiling at 54–57° C. under 12 mm. pressure. With alcoholic picric acid it yields a picrate melting at 140–142° C.

10 grams of this acetal are heated at 110° C. in a distillation flask in an oil bath for 30 minutes with 8 grams of freshly distilled pyridine-2-aldehyde boiling at 62–63° C. under 13 mm. pressure, and the water liberated is distilled off. The last traces of water are then removed at 100° C. under 12 mm. pressure, and the residue is distilled under a high vacuum. There is obtained N-[pyridyl-(2)-methylidene]-amino-acetaldehyde-diethylacetal in the form of a yellowish oil boiling at 109–114° C. under 0.5 mm. pressure.

Example 2

15 grams of N-[6-methyl-pyridyl-(2)-methylidene]-amino-acetaldehyde-diethylacetal are added dropwise at −5° to 0° C. with stirring to 86 cc. of concentrated sulfuric acid. The mixture is added dropwise at −5° to 0° C. with stirring to 36 grams of phosphorus pentoxide and 10 cc. of concentrated sulfuric acid and the whole is heated for 1 hour at 130° C. with stirring. After cooling, the dark brown reaction product is poured on to ice, rendered alkaline with concentrated ammonia and distilled with steam. The distillate (about 2 liters) is acidified with concentrated hydrochloric acid, the solution not being allowed to heat up too much, concentrated under reduced pressure, saturated with potassium carbonate and extracted with either in a Kutscher-Steudel apparatus. The ethereal solution is dried and evaporated. The residue is distilled in a bulb tube at 60° C. under 0.1 mm. pressure of mercury. The resulting 2-[6'-methyl-pyridyl-(2')-]-oxazole of the formula

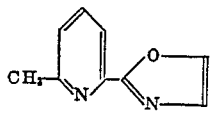

melts at 55-57° C. after recrystallization from a mixture of ether and petroleum ether. It is soluble in ether, alcohol and water.

The starting material is obtained as follows:

10.2 grams (0.1 mol) of 6-methyl-pyridine-2-aldehyde are heated with 11.2 grams (0.11 mol) of amino-acetaldehyde-diethylacetal for 2 hours under reflux at 120-130° C. The dark brown reaction product is distilled at 95-96° C. under 0.04 mm. of mercury. Redistillation at 60-63° C. under 0.05 mm. of pressure in a bulb tuber yields N-[6-methyl-pyridyl-(2)-methylidene] - amino - acetaldehyde-diethylacetal in the form of an almost colorless oil.

Example 3

5 grams of amino-acetaldehyde-diethylacetal are heated with 4 grams of isonicotinaldehyde for 1 hour at 150° C. The water formed is distilled continuously under reduced pressure. There are obtained 8.5 grams of almost colorless azomethine base. 5 grams of the latter are added dropwise to 20 cc. of cencentrated sulfuric acid at −10° C. A solution of 8 grams of phosphorus pentoxide in a little sulfuric acid is added to the mixture while cooling well, and the whole is then slowly heated, finally to a temperature of 150° C. After 1 hour the mixture is allowed to cool, ice is added and the whole is neutralized with concentrated ammonia. The weakly alkaline solution is subjected to steam distillation. The distillate (3 liters) is adjusted to pH 3-4 with concentrated hydrochloric acid, evaporated under reduced pressure to about 200 cc., saturated with potassium carbonate and extracted continuously with ether for 24 hours. The residue (1 gram) of the dry ether phase crystallizes on being scratched with a glass rod. After recrystallization from isopropyl ether the resulting 2-pyridyl-(4')-oxazole of the formula

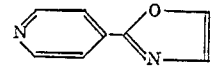

melts at 154-155° C.

By an analogous process using nicotinaldehyde there is obtained the isomeric 2-pyridyl-(3')-oxazole of the formula

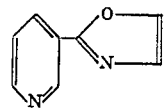

in 43% yield.

Example 4

The 2-pyridyl-(2')-oxazole described in Example 1 can be worked up in the usual way to a pharmaceutical preparation, for example of the following composition:

| | Mg. |
|---|---|
| 2-pyridyl-(2')-oxazole | 100 |
| Lactose | 65 |
| Gelatine | 2 |
| Starch | 65 |
| Magnesium stearate | 1 |
| Talc | 17 |
| | 250 |

What is claimed is:

1. A member selected from the group consisting of 2-pyridyl-oxazoles of the formula

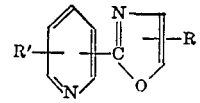

wherein R and R' each represent a member selected from the group consisting of hydrogen and a lower alkyl group, and their therapeutically useful acid addition salts.

2. 2-pyridyl-(2')-oxazoles of the formula

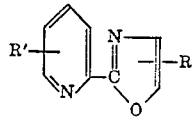

wherein R and R' each represent the substituent $(CH_2)_nH$, said $n$ being an integer from 0 to 7, both inclusive.

3. A therapeutically useful acid addition salt of a compound of claim 2.

4. 2-pyridyl-(2')-oxazole.
5. 2-[6'-methyl-pyridyl-(2')-]-oxazole.
6. 2-pyridyl-(4')-oxazole.
7. 2-pyridyl-(3')-oxazole.

References Cited in the file of this patent

Braz et al.: Chem. Abstracts, vol. 50, col. 14711 (1956).